(12) United States Patent
Iwabuchi

(10) Patent No.: US 7,100,892 B2
(45) Date of Patent: Sep. 5, 2006

(54) NON-RUBBING GATE VALVE FOR SEMICONDUCTOR FABRICATION APPARATUS

(75) Inventor: Toshiaki Iwabuchi, Gunma (JP)

(73) Assignee: Kitz SCT Corporation, Tokyo (JP)

( * ) Notice: Subject to any disclaimer, the term of this patent is extended or adjusted under 35 U.S.C. 154(b) by 48 days.

(21) Appl. No.: 10/921,107

(22) Filed: Aug. 19, 2004

(65) Prior Publication Data

US 2005/0045846 A1   Mar. 3, 2005

(30) Foreign Application Priority Data

Aug. 26, 2003   (JP) ............................. 2003-301159

(51) Int. Cl.
*F16K 25/00*   (2006.01)
(52) U.S. Cl. ...................... 251/187; 251/204; 251/229
(58) Field of Classification Search ................ 251/187, 251/193, 203, 204, 229
See application file for complete search history.

(56) References Cited

U.S. PATENT DOCUMENTS

| | | | | | |
|---|---|---|---|---|---|
| 1,391,987 | A | * | 9/1921 | Smith Whaley ............ | 251/187 |
| 3,330,530 | A | * | 7/1967 | Andrae ....................... | 251/204 |
| 4,036,260 | A | * | 7/1977 | Davis et al. ................ | 251/187 |
| 4,044,993 | A | * | 8/1977 | Wheeler ..................... | 251/187 |
| 4,132,385 | A | * | 1/1979 | DeRouen et al. ........... | 251/187 |
| 5,975,492 | A | * | 11/1999 | Brenes ....................... | 251/175 |
| 6,056,267 | A | * | 5/2000 | Schneider .................. | 251/204 |
| 6,095,741 | A | * | 8/2000 | Kroeker et al. ............. | 251/193 |
| 6,390,449 | B1 | * | 5/2002 | Ishigaki et al. ............. | 251/193 |

FOREIGN PATENT DOCUMENTS

JP           3323459        6/2002

* cited by examiner

*Primary Examiner*—John Bastianelli
(74) *Attorney, Agent, or Firm*—Wenderoth, Lind & Ponack, L.L.P.

(57) ABSTRACT

A gate valve includes a valve main body having a gate valve body attached to a valve rod; a movement operation mechanism that moves the valve rod in a direction along an axis of the rod up to a position where the gate valve body stops up a flow passage port used for carrying in and out objects; a rotating motion mechanism for rotating the valve rod, which has been moved to that position, by a predetermined angle; and a horizontal drive gear for moving the valve body in a direction orthogonal to the direction of movement of the valve rod to seal the flow passage port.

6 Claims, 10 Drawing Sheets

NON-RUBBING GATE VALVE FOR SEMICONDUCTOR FABRICATION APPARATUS

BACKGROUND OF THE INVENTION

1. Field of the Invention

The present invention relates to a gate valve, particularly to a non-rubbing gate valve that is employed for opening and closing, e.g. for carrying in and out objects to be treated, such as semiconductor wafers and liquid crystal substrates.

2. Description of the Prior Art

A gate valve of this kind is employed in a semiconductor-manufacturing field, liquid crystal-manufacturing field or similar field. For example, it is used as a partition of a load lock chamber, transfer chamber or reactor of a CVD apparatus. In a semiconductor-manufacturing apparatus, cleanliness is required, and thus the generation of particles or the like has to be particularly suppressed. In a gate valve for a semiconductor-manufacturing apparatus, a valve-side seat surface is rubbed against a flow passage-side valve seat surface, and the generation of particles or dust may be increased. Therefore, countermeasures for preventing the rubbing between the valve-side seat surface and the flow passage-side valve seat surface are generally taken.

As a countermeasure, in a gate valve for a semiconductor-manufacturing apparatus, a valve body is integrally provided with a valve rod, and a cam or link is provided at the valve rod to attempt to make the valve body non-rubbing. Particularly, upon the actuation of such a gate valve, first, the valve rod is moved in a direction along its axis to move the valve body to the same height level as the flow passage port, and then, the valve body is swayed together with the valve rod using a cam or link to close the valve.

To be specific, a known two-cylinder structure comprises a cylinder that moves a valve rod in a direction along its axis and another cylinder that moves the valve body in a direction orthogonal to the valve rod to close the valve. Meanwhile, a one-cylinder structure is also known, in which a cylinder moves a valve rod in its axial direction and then, by means of a cam or link incorporated in a valve body, moves the valve body in a direction orthogonal to the axial direction of the valve rod to close valve.

Of these, there has been proposed, as a gate valve of the latter one-cylinder structure, the gate valve having a structure in which a valve body is moved toward a flow passage, i.e. in a direction orthogonal to the movement direction of a valve rod, by means of a piston and a cam or link that are incorporated in the valve body (Japanese Patent No. 3323459, for example).

The prior art gate valve is provided with a displacement mechanism that displaces a valve disk formed in a valve box for opening and closing a flow passage, in a direction substantially orthogonal to the axis of a valve rod. The displacement mechanism comprises a box that is fixedly attached to an end of the valve rod, a displacement member provided to be displaceable within the box, a connection member that is connected to the valve disk and a pin member that is engaged in a long hole formed in the displacement member. Upon actuation, the valve disk is moved in a direction perpendicular to the valve rod and toward the flow passage by the action of a cam of the displacement mechanism.

In a gate valve having the former two-cylinder structure, a valve body is moved in a direction orthogonal to a valve rod, thereby attaining sealing from a direction orthogonal to the flow passage. However, the structure assumes complexity due to the existence of increased number of cylinder structure to thereby elevate the cost, which is problematic.

In the gate valve having the latter one-cylinder structure, a cam or link is incorporated in the valve body to enable the valve body to be rotated in a direction orthogonal to the axial direction of the valve rod. Therefore, when the valve body is to be rotated after the valve rod is moved in a direction for closing the valve, the rotation movement assumes a circular arc movement. This applies force to an O-ring, which is provided at the valve body for sealing, in a direction to cause distortion of the O-ring, which is problematic. Meanwhile, in the course of rotation of the valve body for opening the valve, force is applied to the O-ring in a direction causing distortion thereof in the same manner as in the case of closing the valve. Particularly when the valve is kept in a closed state over a long period of time, O-ring is adhered to the valve seat surface in some cases. In such cases, greater force that causes distortion is applied to the O-ring, resulting in possible dropout of the O-ring. As described above, the prior art gate valves fail to achieve a target object to provide non-rubbing gate valves, and great distortion force is applied to the O-ring upon either opening or closing the valve. Thus, particles are readily generated, the product service life becomes short, and there is a possibility of the O-ring being dropped out.

Meanwhile, in a gate valve of the Japanese Patent No. 3323459, a box is provided outside a displacement mechanism on purpose. Accordingly, the structure of the displacement mechanism tends to be complex and large in size.

The present invention has been developed in order to solve the conventional problems, and an object of the present invention is to provide a gate valve in which a sealed portion is not rubbed upon opening and closing of the valve, and distortion or dropout of a seal member is not caused to make it possible to suppress generation of particles or dusts and reliably maintain the sealing property over a long period of time even when opening and closing operations of the valve is repeatedly carried out.

SUMMARY OF THE INVENTION

In order to achieve the above described object, a first aspect of the present invention provides a gate valve comprising: a valve main body having a gate valve body attached to a valve rod; a movement operation mechanism that moves the valve rod in a direction along an axis of the valve rod up to a position where the gate valve body stops up a flow passage port used for carrying in and out objects; a rotating motion mechanism for rotating the valve rod, which has been moved to that position, by a predetermined angle; and a horizontal drive gear for moving the gate valve body in a direction orthogonal to the direction of movement of the valve rod to seal the flow passage port.

In the gate valve, as a second aspect of the invention, the movement operation mechanism is a cylinder disposed in the valve main body.

In any one of the gate valves mentioned above, as a fourth aspect of the invention, the rotating motion mechanism comprises a screw of a lead angle of about 45 degree provided at the valve rod and a change nut.

The gate valve further comprises, as a fifth aspect of the invention, a guide roller provided at the valve rod to be guided into an L-shaped guide groove formed in a housing for the valve main body, which groove comprises an upright groove and a circular arc groove.

In the gate valve, as a sixth aspect of the invention, the horizontal drive gear comprises an eccentric cam provided rotatably at an upper end of the valve rod in the gate valve body.

In the gate valve just mentioned above, as a seventh aspect of the invention, the eccentric cam enables the gate valve body to attain sealing at a bottom dead center of the eccentric cam.

The gate valve further comprises, as an eighth aspect of the invention, a bellows attached to the valve body for elongating or contracting with the movement of the valve rod to form a bellows seal structure which is displaced in a substantially orthogonal direction when the gate valve body has moved at the flow passage port to the direction orthogonal to the direction of the movement of the valve rod.

According to the first aspect of the invention, upon opening and closing of the valve, a force which is imposed in a direction that causes a sealed portion to be rubbed with a valve seat is not generated. Therefore, a seal member is not distorted and generation of particles is suppressed, thereby exhibiting an excellent sealing property, and there is no risk the seal member being dropped out. In addition, excellent sealing property is reliably maintained over a long period of time even if opening and closing operations of the valve are repeatedly carried out.

According to the second or third aspect of the invention, an ordinary movement mechanism is employed as the movement operation mechanism and can therefore be incorporated rationally in a gate valve.

According to the fourth aspect of the invention, rectilinear motion of the valve rod is efficiently converted to rotational motion by actuating the movement operation mechanism, and a great thrust for sealing the valve can be generated. For example, when a screw having a pitch of 60 mm and a lead angle of 45 degree is moved by 15 mm to convert the movement of the valve body in the direction orthogonal to the movement of the valve rod to 2 mm, a thrust 7.5 times the thrust of the movement operation mechanism can be obtained (excluding a screw efficiency), thereby providing a gate valve which is reduced in size and exhibits excellent durability.

According to the fifth aspect of the invention, reciprocation movement of the movement operation mechanism enables the valve rod to be reliably moved and rotated. The movement and rotation of the valve rod enables the valve body to be smoothly and stably moved.

According to the sixth aspect of the invention, distortion of the sealed portion is infallibly prevented, and the movement of the valve body during the course of opening or closing the valve is moderated to thereby suppress adverse effects on the sealed portion to a minimum possible level. No additional cylinder is required, and the cylinder that moves the valve rod may be used without giving any modification thereto to enable a highly efficient conversion. In addition, since the gate valve body is landed softly upon opening and closing of the gate valve body, generation of particles is suppressed to a minimum possible level.

According to the seventh aspect of the invention, when closing the valve, sealing is attained at the bottom dead center of the eccentric cam. Even when clamping force exerted on the valve body seal material or thrust generated by inverse pressure to the valve body is imposed on the valve rod, such force is not converted to force that would rotate the valve rod reverse. Therefore, valve-sealing function is maintained even when stooping feed of air to the cylinder. The thrust at the sealing portion and valve seat is maintained at a constant level to maintain sealing is at all times with appropriate thrust. Thus, an excellent sealing property is obtained. In addition, upon opening the valve, no spring is required in order to pull the valve body away. The valve body is reliably pulled away by means of the eccentric cam. Therefore, the valve body is reliably opened and closed without causing any distortion in the valve body seal material even when the seal material assumes adhesiveness.

According to the eighth aspect of the invention, the bellows can be displaced following the movement of the gate valve body to attain reliable sealing from outside, and the mechanism section, such as an eccentric cam, can be incorporated in the valve body. Therefore generation of particles are suppressed to a minimum possible level. In addition, plural bellows are not required because of the structure that moves the valve body in a direction orthogonal to the valve rod. Therefore, the structure contributes to reduction of the size and cost and makes the assemblage easy.

DETAILED DESCRIPTION OF THE PREFERRED EMBODIMENTS

Figure 1:
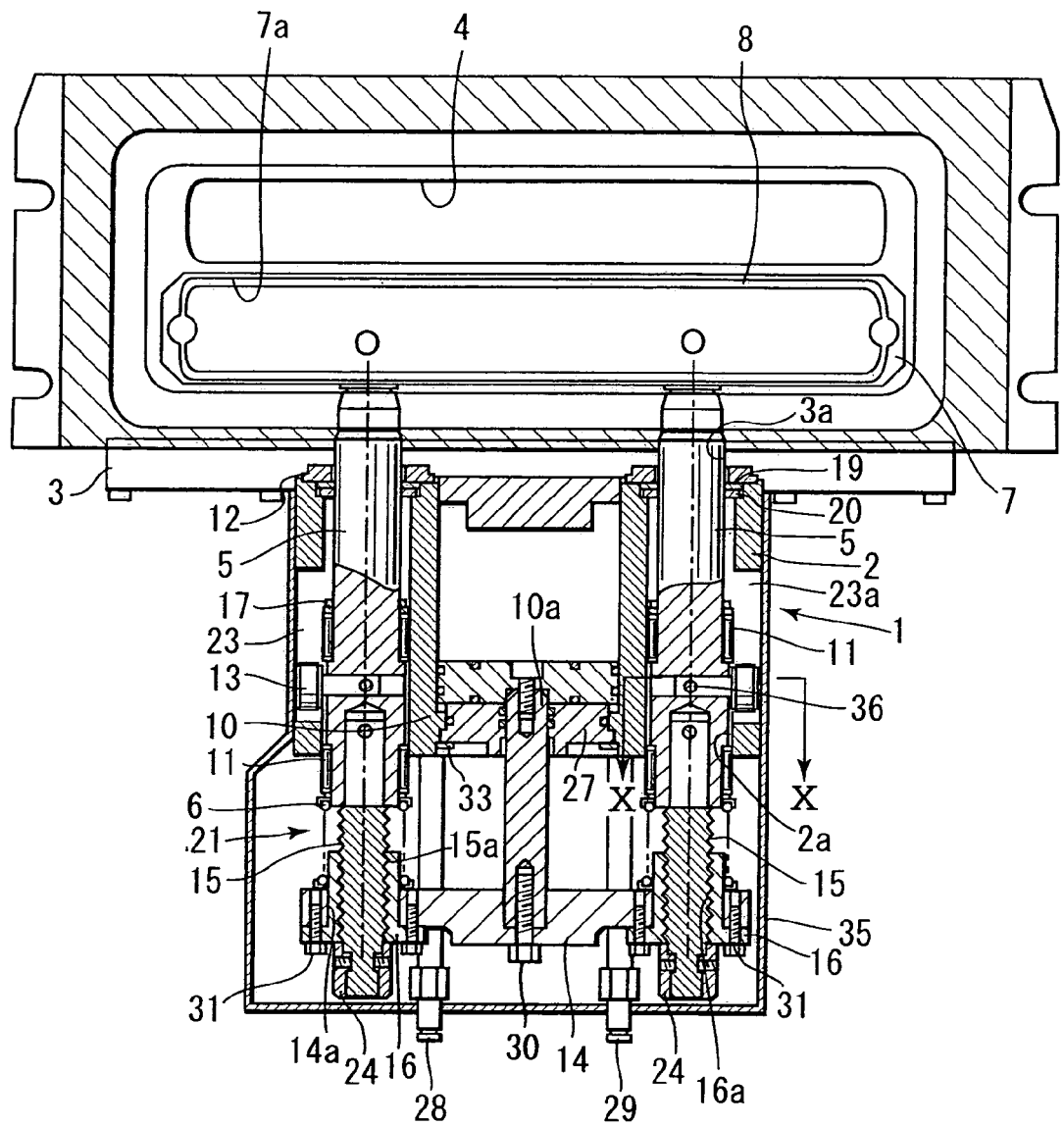
FIG. 1 is a vertically sectioned front view showing an embodiment of a gate valve according to the present invention in an opened state.

The present invention will be described in detail using embodiments of a gate valve with reference to the accompanying drawings. In the embodiment shown in FIG. 1 through FIG. 5, a valve main body 1 comprises, for example, an actuator or a cylinder housing, and forms the entirety of a gate valve of the present invention. A housing 2 is a structure provided therein with a movement operation mechanism 10 and a rotating motion mechanism 21 that will be described later. A body 3 serving as a bonnet is fixedly provided at the upper portion of the housing 2 in a fashion integral with the housing. A flow passage port 4 is formed at a position above the front side of the body 3. The flow passage port 4 may be provided as a chamber insert in a chamber. In this case, the port may be provided as integrated with the chamber.

In a modification, the body 3 may be separated from the housing 2. In another modification, the flow passage port may be formed at a position below the front side of the body 3, with the body turned upside down. In another modification, the valve main body 1 may be disposed laterally. These modifications are arbitrarily set in accordance with each implementation.

Valve rods 5 are provided to extend toward the position of the flow passage port 4, and a gate valve body 7 is attached to the respective distal ends of the valve rods 5. Each of the valve rods 5 is moved along the direction of its axis by the movement operation mechanism 10 which is provided in the housing 2 and then rotated by the rotating motion mechanism 21. At the time the rods are rotated, the gate valve body 7 is moved in a horizontal direction by means of a horizontal driving gear 22 to tightly seal therewith the outer periphery of the flow passage port 4 of the body 3. In this manner, opening and closing of the flow passage port 4 are carried out.

Figure 6:
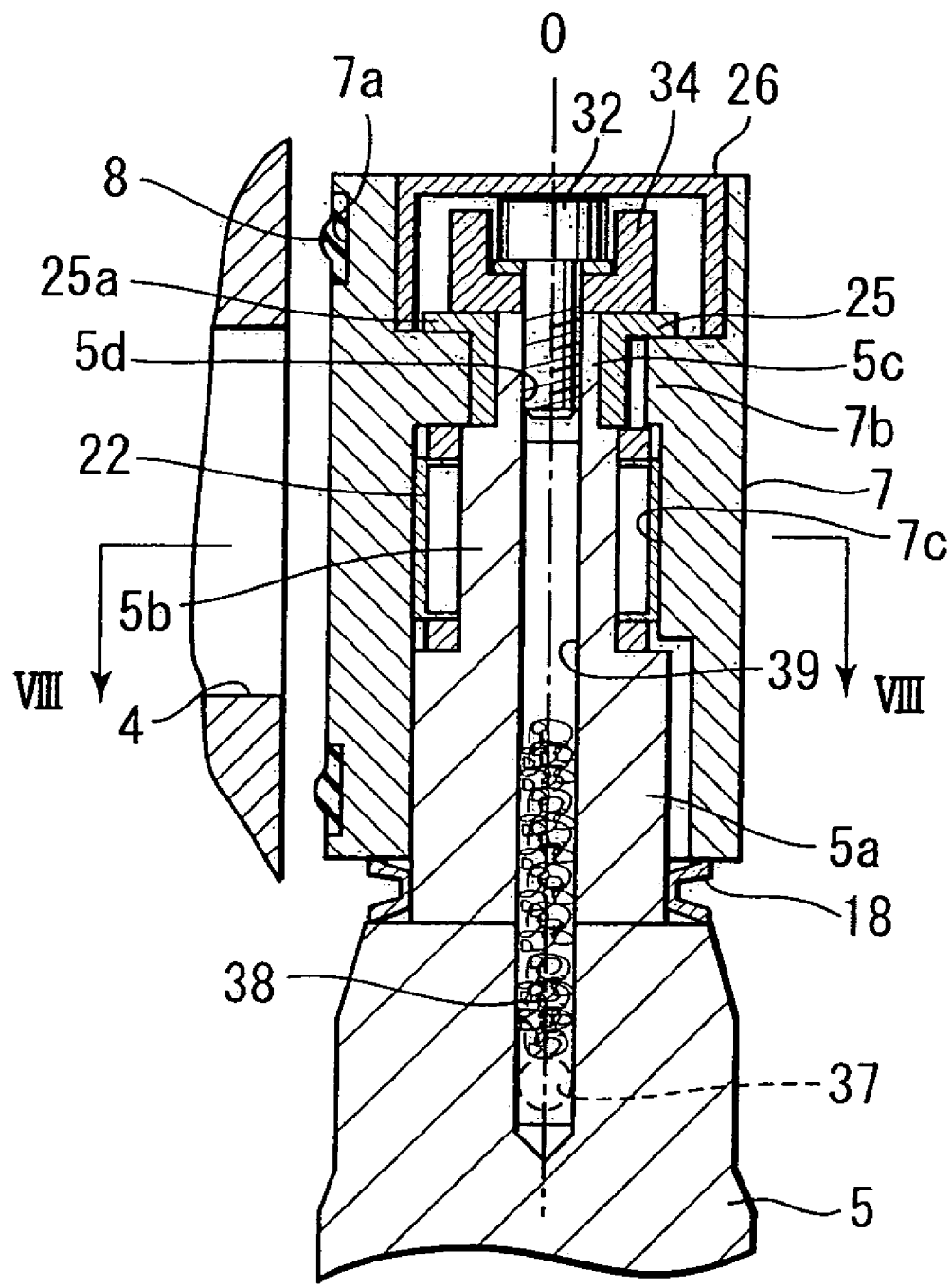
FIG. 6 is a partially enlarged sectional view of the gate valve body of FIG. 4 and its neighborhood.

In FIG. 6, a reentrant groove 7a is provided in the peripheral portion of the front side of the gate valve body 7. An annular seal member 8 of fluorocarbon rubber that is formed to be somewhat protruding in the center portion thereof is fitted in the reentrant groove 7a so that the seal member is able to seal the flow passage port 4. The seal member 8 is substantially circular in cross section.

In modifications, the section of the seal member 8 may be of other shapes, and the seal member 8 may be provided on the side of the flow passage port 4.

The movement operation mechanism 10 provided in the housing 2 in FIG. 1 comprises a cylinder equipped with a slidable piston rod 10a. The cylinder 10 has the piston rod 10a, which is movable in an axial direction of the valve rod 5 in order to move the gate valve body 7 to a position where the flow passage port 4 is covered. The port 4 can be used for carrying in and out objects. A bearing member 27 is fixedly attached to the housing 2 by means of, for example, a snap ring 33. The bearing member 27 enables the piston rod 10a of the cylinder 10, when the piston rod is moved in a vertical direction, to attain reliable sealing while the piston rod is kept smoothly slidable.

The valve rods 5 protrude toward the side of the flow passage port 4 of the body 3 from the through holes 3a formed in the body 3. The gate valve body 7 is attached to the distal ends of the valve rods 5. At the position where the gate valve body 7 is mounted on the valve rod 5, as shown in FIG. 6, a seal ring 18 of PTFE or the like is provided to form a seal between the body 7 and rod 5 and also seal the portion of an eccentric cam that is incorporated in the gate valve body 7 and will be described later, thereby preventing scattering of particles.

In the present embodiment, two valve rods 5 are adopted. In modifications, one or three or more valve rods may be provided, and the number thereof may be determined appropriately in accordance with, for example, the size of the movement operation mechanism 10. As another example of the movement operation mechanism, a motor drive mechanism (not shown) may be adopted. In this case, the motor drive mechanism is disposed in the valve main body and an appropriate gear mechanism is used to give a turning force from the motor to the valve rod 5, thereby enabling the valve rod 5 to move in the direction of the axis O of the rod.

Needle bearings 11 in FIG. 1 are provided at two points around the axis of each valve rod 5 so that the valve rod 5 is smoothly slid and rotated when the valve rod 5 is inserted into an insert hole 2a formed in the housing 2.

A seal packing 12, formed of rubber or resin, is attached to the lower part of the body 3 to support the valve rod 5 slidably and rotatably on the inner circumference thereof and seal the valve rod 5 so as to induce no leakage.

A thrust bearing 19 is attached to the bottom of the seal packing 12 by means of a washer 20. When the valve rod 5 is elevated, annular protrusion 17 provided on the valve rod 5 for attaching the needle bearing 11 abuts the washer 20 so as to absorb the impact of elevation. When a guide roller 13 that will be described later is moved along a circular arc groove 23b of an L-shaped guide groove 23 in FIG. 4, the guide roller 13 is prevented from contacting the side surface of the groove to prevent wear of the circular arc groove 23b of the L-shaped guide groove 23.

The rotating motion mechanism 21 shown in FIG. 1 comprises a screw 15 having a male thread 15a having a lead angle of about 45 degrees and a change nut 16 having a female thread 16a which is meshed with the male thread 15a. The screw 15 is provided at the bottom of the valve rod 5. The mechanism 21 is configured such that when the valve rod 5 is moved upward or downward, the rectilinear motion of the rod 5 is converted into rotational motion. That is, the valve rod 5 is provided to be rotatable by 90 degrees, which is a predetermined angle, by relative rotating motion caused by a combination of the screw 15 and the change nut 16, after the valve rod 5 is elevated so as to move the gate valve body 7 to a position covering the flow passage port 4.

A cam plate 14 shown in FIG. 1 is placed beneath the cylinder 10 and makes the piston rod 10a, change nut 16 and the valve rods 5 integral with each other so that the valve rods 5 are vertically or rotationally movable with the vertical movement of the piston rod 10a. A perforated portion is formed in the center of the cam plate 14, and the bottom of the piston rod 10a is inserted in the perforated portion and joined to the cam plate with a bolt 30. Perforated portions 14a are provided at both sides of the cam plate 14, and the change nuts 16 are fixedly attached thereto with bolts 31 in a state in which the nuts are fitted in the perforated portions 14a. A spring 6 is provided between the cam plate 14 and the valve rod 5 in such a manner to exhibit a bouncing force, and the bouncing force is imposed on the cam plate 14 to urge the valve rod 5 in the upward direction.

Below the change nut 16, a stopper 24 is attached to the screw 15. Upon the downward movement of the change nut 16, the stopper 24 abuts the change nut 16. This avoids the contact of the guide roller with the groove when the guide roller 13 moves along the circular arc groove 23b of the L-shaped groove 23 that will be described later, thereby preventing wear of the circular arc groove 23b of the L-shaped guide groove 23.

In the actuation of the rotating motion mechanism 21, the piston rod 10a of the cylinder 10 is elevated to elevate the cam plate 14 connected to the piston rod 10a. Therefore, the valve rods 5 elevate by a predetermined length, with the elevation of the cam plate 14 and then the elevation is halted. Herein, since the bouncing force of the spring 6 is stronger than the turning force of the valve rod 5 that is produced by the elevation of the cam plate 14, the valve rod 5 does not rotate but elevates. When the valve rod 5 reaches the limitation position of elevation, the elevation is halted to initiate the rotation of the valve rod 5 relative to the change nut 16 which is the fixed side due to meshing between the screw 15 and the change nut 16 below the valve rod 5, and the motion of the valve rod 5 attempting to elevate itself is converted to rotating motion.

In the present embodiment, the lead length of the female thread 16a is set at about 60 mm and, when the screw 15 is vertically moved in a stroke of 15 mm, the lead angle is 45 degrees. Thus, the valve rod 5 is rotated by 90 degrees.

Figure 4:
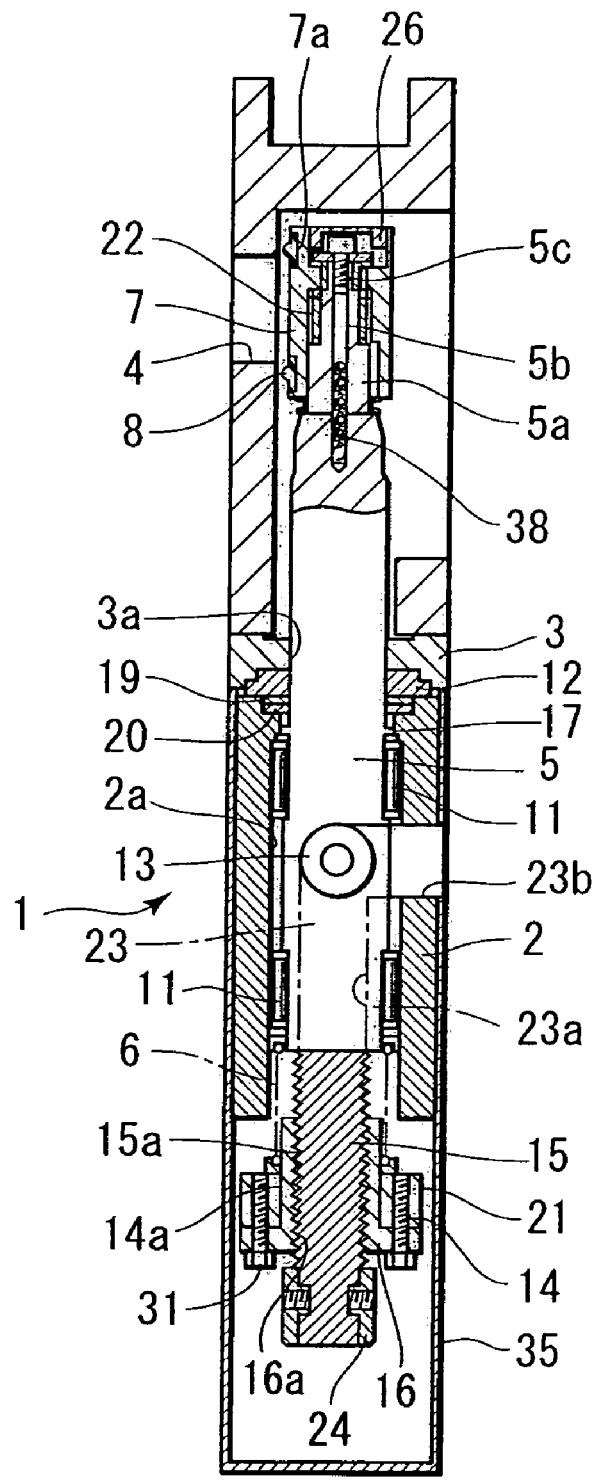
FIG. 4 is a vertically sectioned side view of FIG. 2.

As shown in FIG. 1, the guide roller 13 is mounted by means of a setscrew 36, such as a hexagon socket head screw, so as to protrude in a direction perpendicular to the axis O of the valve rod 5. Meanwhile, the L-shaped guide groove 23 that corresponds to the movement of the guide roller 13 is provided in the outer periphery of the insert hole 2*a* of the housing 2. The L-shaped guide groove 23 comprises the upright groove 23*a* and the circular arc groove 23*b*. It guides the vertical movement of the valve rod 5 using the upright groove 23*a* and guides the rotating motion of the valve rod 5 using the circular arc groove 23*b*. The circular arc groove 23*b* of the right-hand side L-shaped guide groove 23 in FIG. 1 is provided at the back side of the housing 2 as shown in FIG. 4, and the circular arc groove 23*b* of the left-hand side is provided at the front side of the housing 2. Accordingly, for example, when the valve rod 5 is slid upwardly, the guide roller 13 is guided along the upright groove 23*a* of the L-shaped guide groove 23 and reliably moves vertically and, before abutting the upper periphery of the upright groove 23*a*, the guide roller 13 abuts the thrust bearing 19, washer 20 and the valve rod 5 to halt the vertical movement thereof and when the valve rod 5 is rotated, the guide roller 13 is guided along the circular arc groove 23*b* of the L-shaped guide groove 23 by the action of the right screw provided at the screw 15 and change nut 16, and at the same time, horizontal rotation is reliably carried out.

The gate valve body 7 and the valve rod 5 carry out L-shaped movement even when the L-shaped guide groove 23 is not provided. However, when the gate valve body 7 is to be moved downwardly, with the seal member 8 assuming a state of adhesiveness, the valve rod 5 is rotated as guided along the circular arc groove 23*b* which is in a horizontal direction of the L-shaped guide groove 23. This rotation induces a force intended to reliably pull away the seal member 8 in a horizontal direction without dragging down the gate valve body 7. In this manner, the movement of the valve rod 5 is reliably supported by provision of the L-shaped guide groove 23.

A closing side fluid feed pipe 28 and an opening side fluid discharge pipe 29 are connected respectively to the ascending side and the descending side of the piston rod 10*a* in the cylinder 10 so that fluid can be fed through them. When fluid is fed to the closing side fluid feed pipe 28 or the opening side fluid discharge pipe 29, the piston rod 10*a* is caused to ascend or descend, thereby closing or opening the gate valve body 7.

Figure 2:
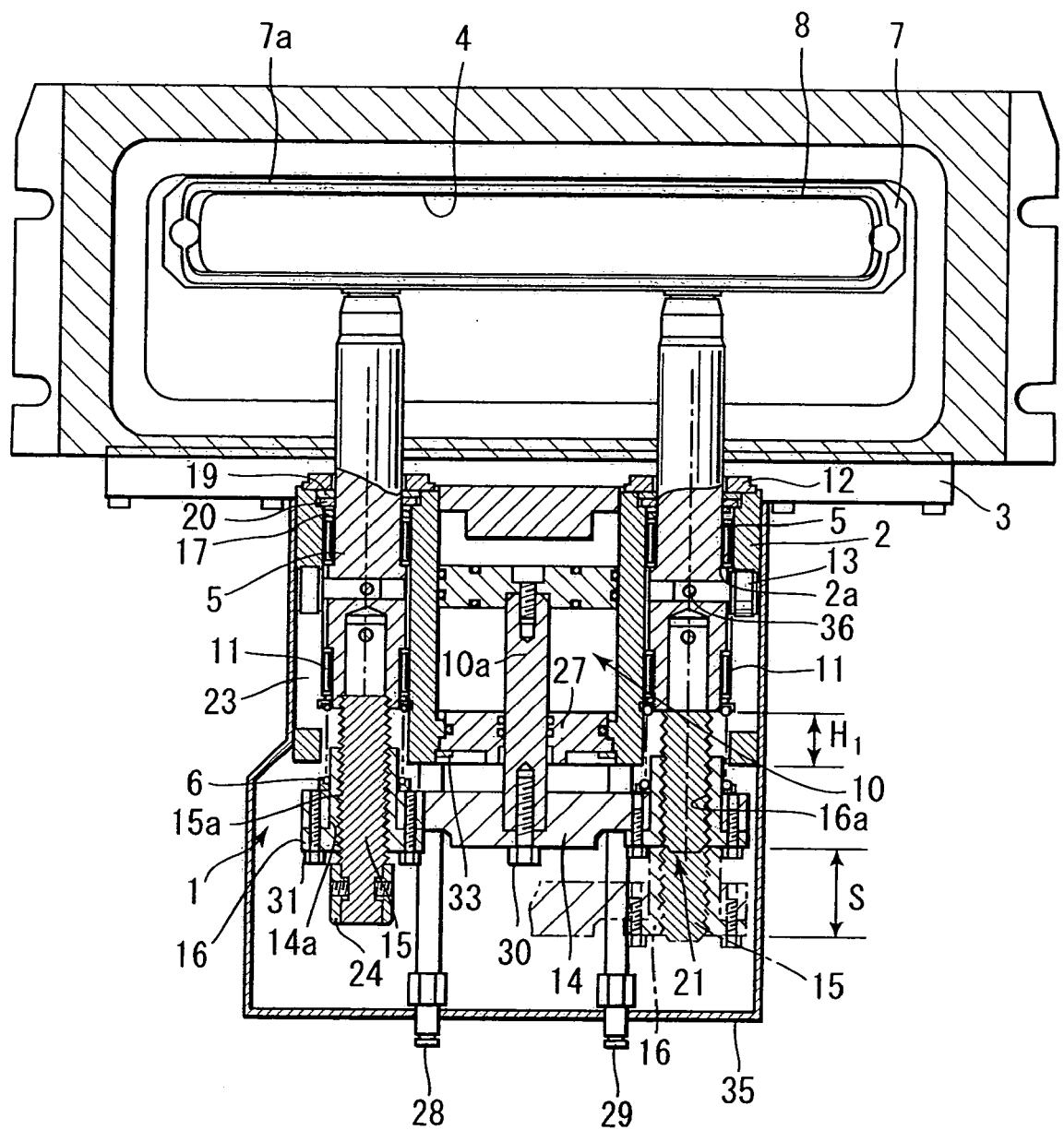
FIG. 2 is a vertically sectioned front view showing a state of the gate valve of FIG. 1 in which the valve rod has been vertically moved.

A cover 35 covers the outer periphery of the housing 2 in an airtight manner and is formed to have a capacity in which a stroke S that is a distance of the sliding movement of the valve rod 5 as shown in FIG. 2 can be secured.

Figure 7:
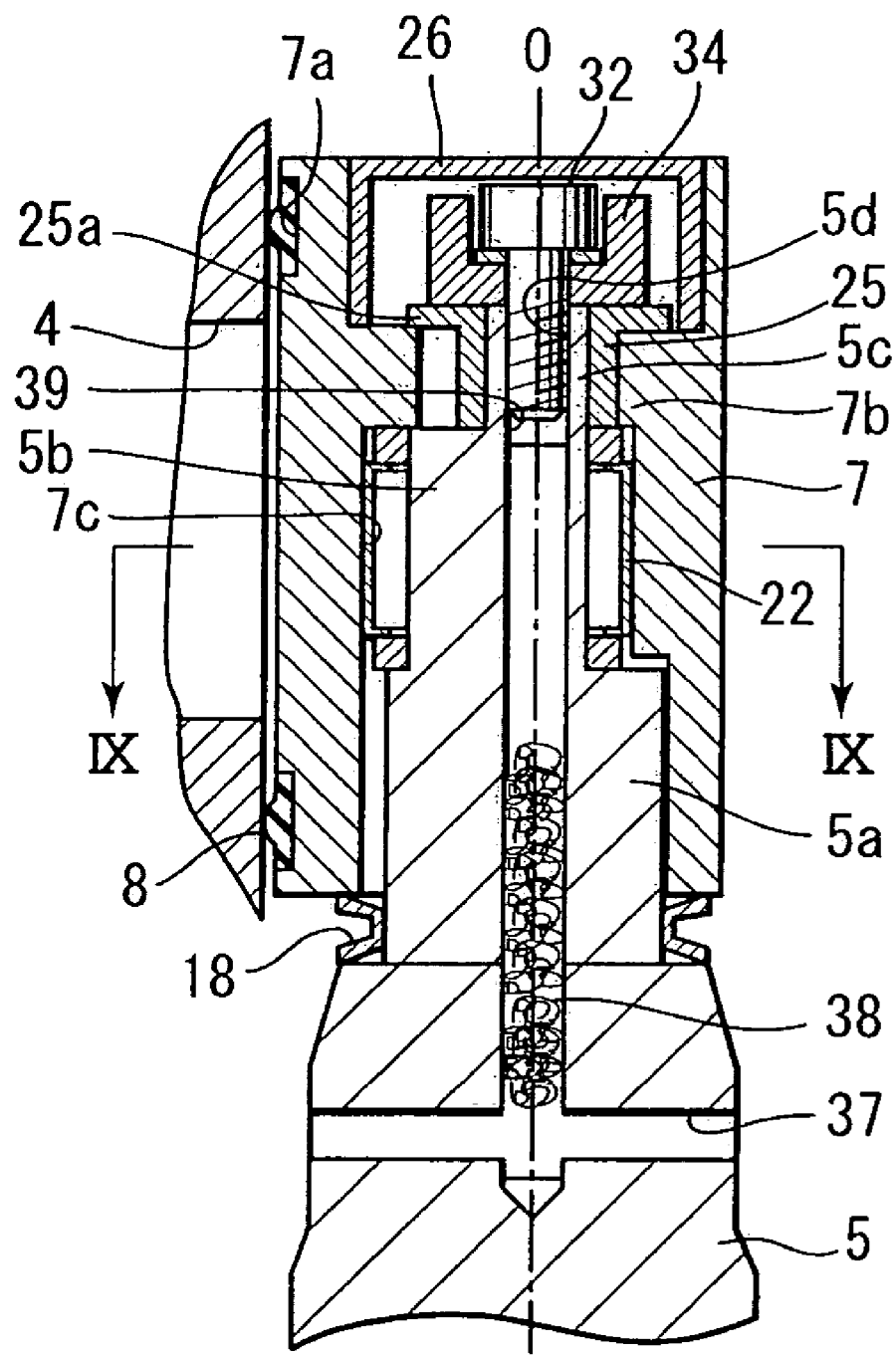
FIG. 7 is a partially enlarged sectional view of the gate valve of FIG. 5 and its neighborhood.

Next, the horizontal drive gear 22 will be described, which moves the gate valve body 7 in a direction orthogonal to the movement direction of the valve rod 5 to enable sealing of the flow passage port 4. In FIG. 4 and FIG. 7, the horizontal driving gear 22 comprises an eccentric cam provided at the upper end of the valve rod 5 of the gate valve body 7. In the upper end of the valve rod 5, a diameter-reduced portion 5*a* is formed at the attachment position of the gate valve body 7; and an eccentric shaft portion 5*b* that is offset by about 2 mm from the axis O of the valve rod 5 is formed on the diameter-reduced portion 5*a*. Further, a small-diameter shaft portion 5*c* concentric with the axis O is provided on the eccentric shaft portion 5*b*. The eccentric cam 22 is attached to, as integrated with, the eccentric shaft portion 5*b*.

Figure 8:
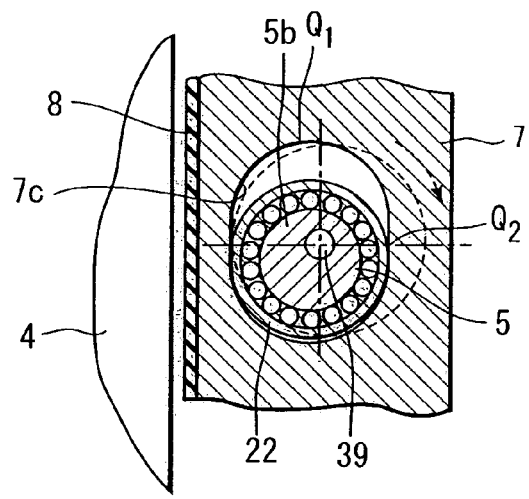
FIG. 8 is a sectional view taken along line VIII—VIII in FIG. 6.
Figure 9:
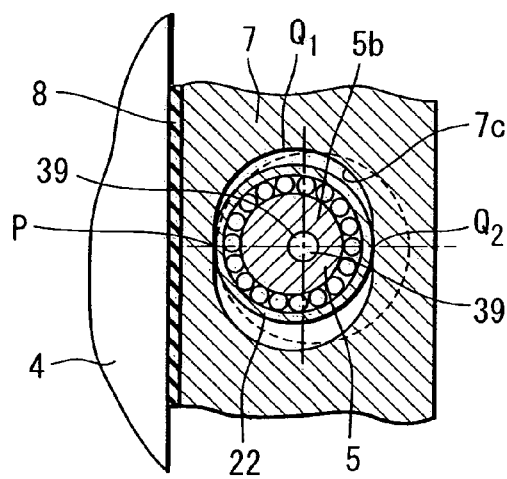
FIG. 9 is a sectional view taken along line IX—IX in FIG. 7.

As shown in FIG. 7, a bearing 25 is engaged with the small-diameter shaft portion 5*c*, with the eccentric cam 22 mounted on the eccentric shaft portion 5*b*. A bolt 32 is fastened, with a reentrant ring 34 placed on the bearing 25, to keep a jaw portion 25*a* on the upper portion of the bearing 25 positioned always on a convex portion 7*b* which is convexly provided on the inner periphery of the gate valve body 7, thereby preventing falling of the gate valve body 7 from the valve rod 5. In addition, the gate valve body 7 is loosely fitted on the valve rod 5. In this state, when the valve rod 5 is rotated by 90 degrees about the axis O shown in FIG. 6, as shown in FIG. 8 and FIG. 9, the rotating motion of the valve rod 5 is converted to horizontal rectilinear motion of the gate valve body 7 by the action of the eccentric cam 22. Herein, in the present embodiment, the gate valve body 7 is moved by about 2 mm in a direction orthogonal to the axis O of the valve rod 5 toward the flow passage. In this manner, the gate valve body 7 is moved in a direction orthogonal to the movement direction of the valve rod 5 by the eccentric cam 22 to seal the flow passage port 4.

When the valve rod 5 is clockwise rotated by 90 degrees by the rotating motion mechanism 21, as shown in FIG. 9, the bottom dead center P of the eccentric cam 22 comes to the point, at an oblong hole 7*c* provided in the gate valve body 7, of the closing position of the gate valve body 7. In this state, sealing by the gate valve body 7 is carried out, and the bottom dead center P of the eccentric cam 22 is at a position that is the longest distance away from the axis O to the outer periphery in a horizontal direction. The gate valve body 7 comes into the state of either opening or closing when the bottom dead center P comes into contact with properly corresponding positions of the oblong hole 7*c*. Specifically, when the bottom dead center P comes into contact with the point $Q_1$ that is the longest distance away from the center of the oblong hole 7*c*, the gate valve body 7 comes to an opened state and, when the bottom dead center comes into contact with the point $Q_2$ that is the shortest distance away from the center of the oblong hole 7*c*, the gate valve body 7 comes to a closed state. FIG. 8 shows a state in which the valve rod 5 is rotated by 45 degrees about the axis O, and FIG. 9 shows a state after rotation of 90 degrees.

A seal flange 26 is attached to the gate valve body 7 from above, with the gate valve body 7 attached to the valve rod 5, to seal the upper side of the gate valve body 7.

In FIG. 6, a port 37 is perforated in a direction substantially orthogonal to the axis O of the valve rod 5 for evacuating air from the inside of the gate valve body 7. A particle filter 38 is provided in a through hole 39 which connects the port 37 and a female thread 5*d* disposed on the inner periphery of the small-diameter shaft portion 5*c* and helically engaged with the bolt 32.

The above described stroke S is a moving distance of the valve rod 5 slid in a vertical direction, whereas a stroke S' (not shown) that is a vertical movement distance of the valve rod 5 required for moving the gate valve body 7 in a horizontal direction toward the flow passage port 4 is equal to the difference between the distance $H_1$ (FIG. 2) before the elevation of the cam plate 14 which is carried out by the helical engagement between the screw 15 and the change nut 16 and the distance $H_2$ (FIG. 3) after elevation of the cam plate. When the cam plate 14 is moved vertically by the stroke S', the movement is converted to the rotational motion of the valve rod 5 as described above and subsequently the rotational motion is converted to rectilinear movement which minutely moves the gate valve body 7 toward the flow passage.

Next, in accordance with the movement of the gate valve in the present embodiment, the operation thereof will be described.

When air is fed into the cylinder 10 from the closing side fluid feed pipe 28 in the state of FIG. 1, the cam plate 14 is elevated and the valve rods 5 on both sides are moved upwardly with the elevation of the cam plate. Herein, even if any force other than that in a vertical direction should be exerted onto the valve rod 5, the guide rollers 13 provided at the outer periphery of the valve rods 5 are guided by the upright groove 23a of the L-shaped guide groove 23 provided in the housing 2. Therefore, the valve rods 5 are reliably moved in a vertical direction. This vertical movement continues until the needle bearings 11 and circular protrusion 17 of the valve rod 5 abuts the thrust bearing 19 and washer 20. By adjusting the abutting position in advance, the gate valve body 7 can be moved to the same level as the flow passage port 4. When the elevation is carried out up to the position shown in FIG. 2, this state is maintained. At this time, the cam plate 14 has been moved the distance of stroke S.

Figure 3:
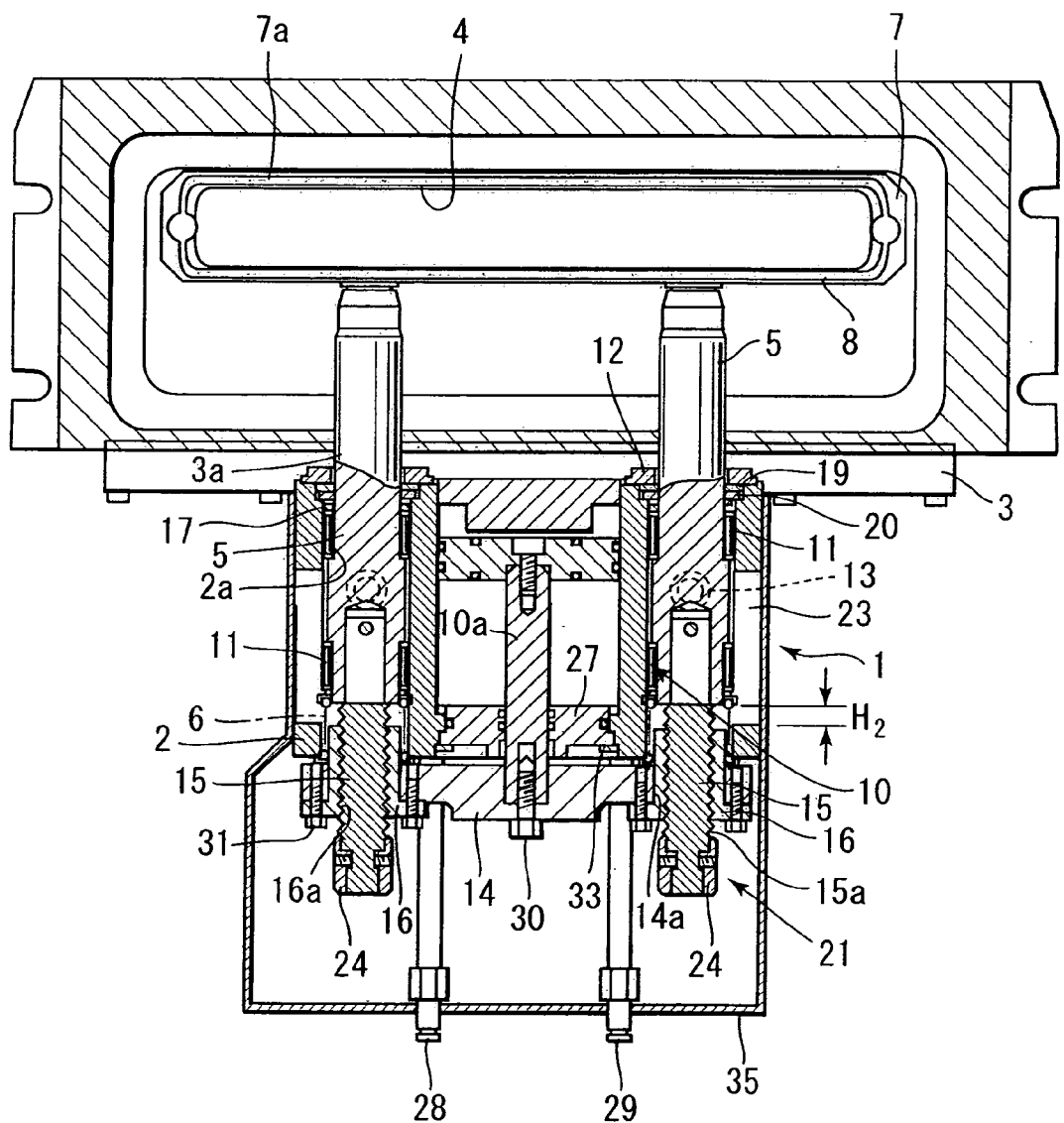
FIG. 3 is a partially omitted, vertically sectioned, front view showing a state in which the valve rod of the gate valve of FIG. 2 has been rotated.

When air is further fed into the cylinder 10, the cam plate 14 that is joined to the piston rod 10a moves upward as shown in FIG. 3. The rectilinear movement in a vertical direction at this time is converted to rotational motion by the screw 15 having a lead angle θ of 45 degrees and the change nut 16 to rotate each valve rod 5 clockwise about the axis O. Since the guide rollers 13 are urged to move along the circular arc groove 23b of the L-shaped guide groove 23, the valve rod 5 can be rotated in a state where the height level of the valve rods 5 in a horizontal direction is maintained, and the height level of the gate valve body 7 is maintained during the conversion of the rectilinear movement of the valve rods 5 to rotational motion.

Figure 10A:
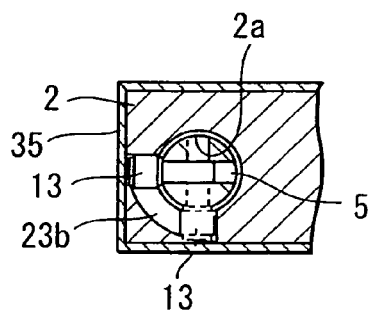
FIG. 10 is a sectional view taken along line X—X in FIG. 1.
Figure 10B:
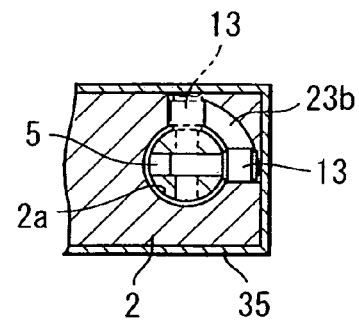

Each of the valve rods 5 is rotated clockwise about the axis O when the cam plate 14 has been vertically moved by 15 mm and, as shown in FIG. 10, the guide rollers 13 are moved respectively to the circular arc grooves 23b of the L-shaped guide grooves 23 on the front and back sides of the housing 2.

Figure 5:
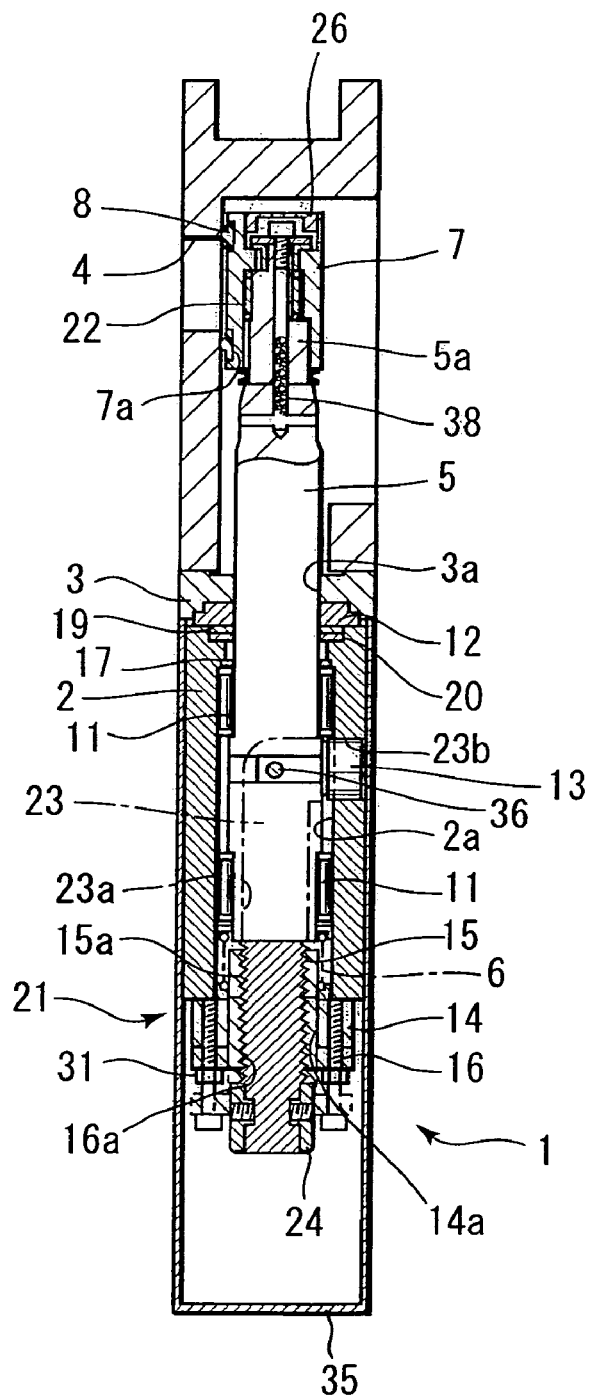
FIG. 5 is a vertically sectioned side view of FIG. 3.

While the eccentric cam 22 attached to the eccentric shaft portion 5b is rotated eccentrically with the rotating motion of the valve rods 5, the rotation of the eccentric cam 22 allows the bottom dead center P to rotate from the point $Q_1$ to the point $Q_2$ in FIG. 8 and FIG. 9. In the oblong hole 7c, the distance from the center to the point $Q_2$ is set to be shorter than that to the point $Q_1$. This enables the outer peripheral surface of the eccentric cam 22 to thrust the gate valve body 7 toward the flow passage port 4. Therefore, the gate valve body 7 moves horizontally as thrust by the eccentric shaft portion 5b and seals the passage port 4 as shown in FIG. 5 in such a manner as to come in contact with the flow passage port 4 from the orthogonal direction. Since the rotating motion of the valve rod 5 is converted to rectilinear movement in a horizontal direction by the eccentric cam 22, as described above, a force in a direction which causes distortion is not exerted onto the seal member 8, thereby moving the gate valve body 7 relative to the flow passage port 4 without rubbing the flow passage port and suppressing generation of particles and dusts.

Meanwhile, in order to change the gate valve body 7 from a closed state to an opened state, air is fed to the opening side fluid discharge pipe 29 to rotate the valve rods 5 in a direction opposite to that as described above. The movements are carried out inversely to those described above to bring the gate valve body 7 to the opened state. In this case, the gate valve body 7 is put away from the flow passage port 4, and force that is applied in a direction causing distortion is not imposed on the seal member 8. Therefore falling of the seal member 8 is reliably prevented even when, for example, the gate valve body 7 has been kept in a sealing state over a long period of time and the seal member 8 has adhered to a non-illustrated valve seat surface of the flow passage port 4.

Next, other embodiments of a gate valve according to the present invention will be described. The parts same as those in the embodiment described above are denoted by the same reference numerals and explanations thereof are omitted from the following embodiments.

Figure 11:
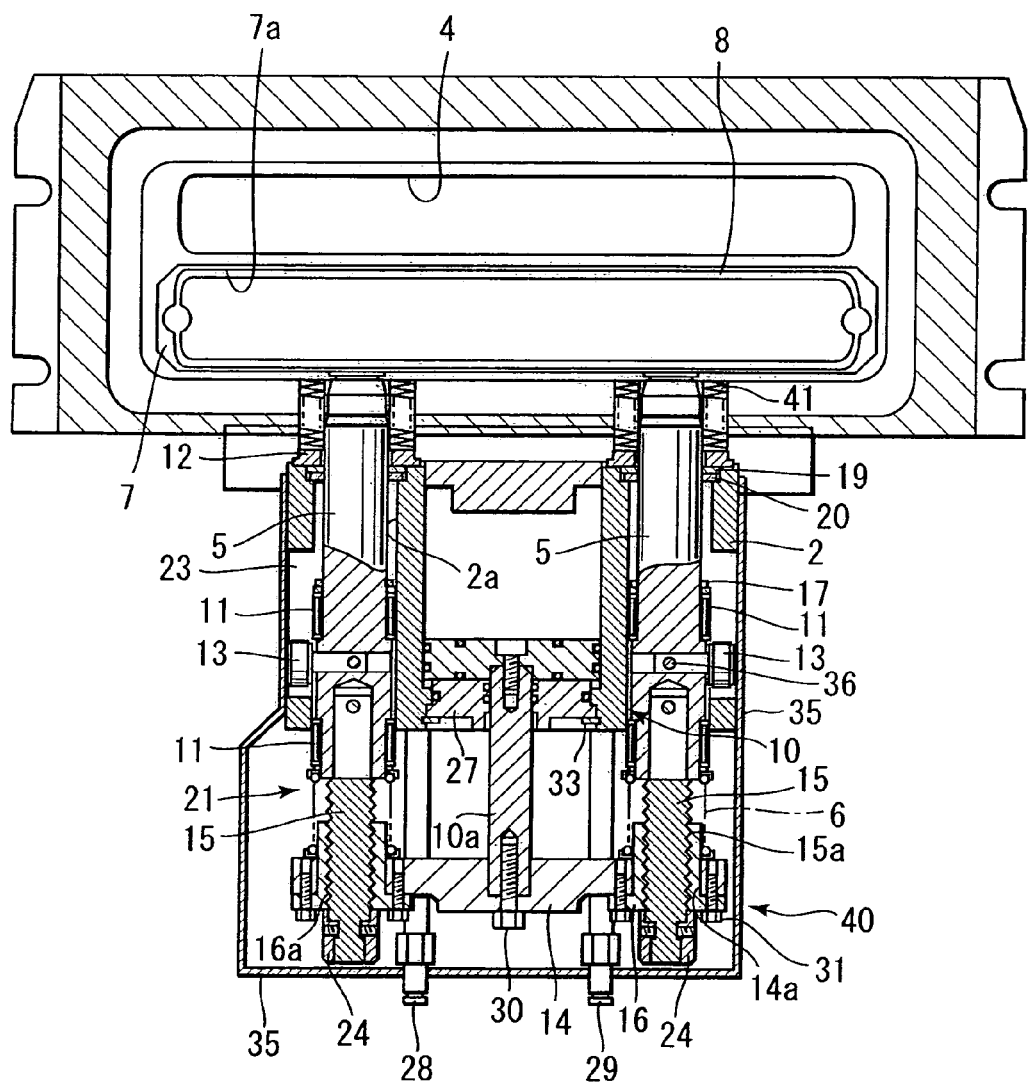
FIG. 11 is a vertically sectioned front view showing another embodiment of a gate valve according to the present invention in an opened state.
Figure 12:
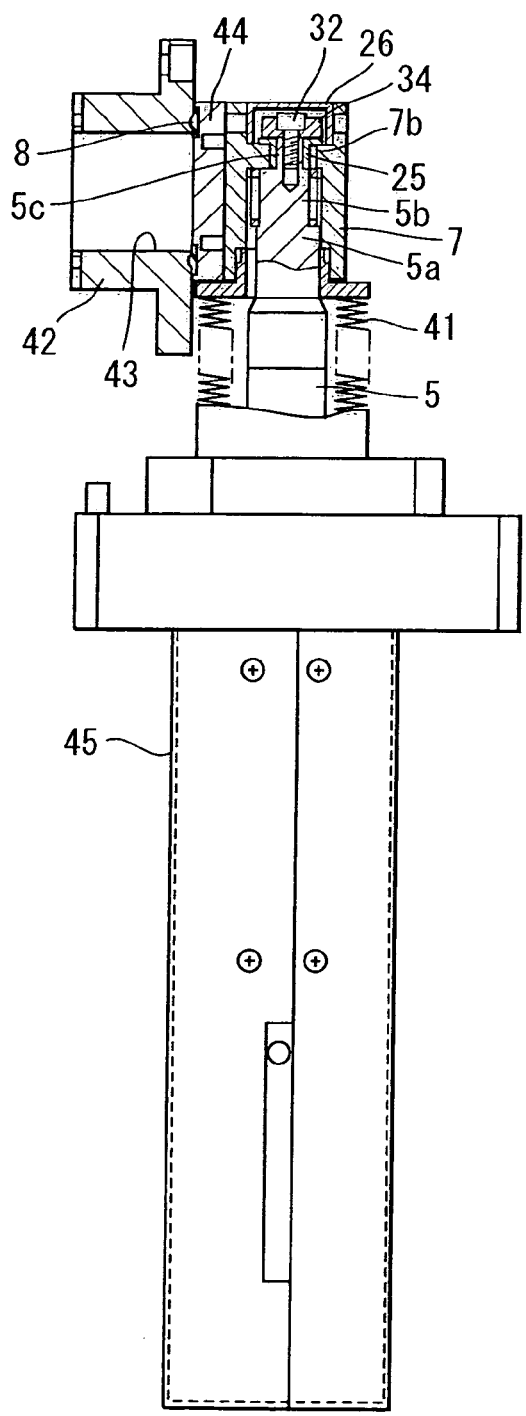
FIG. 12 is a vertically sectioned side view showing still another embodiment of a gate valve according to the present invention in an opened state.

FIG. 11 is a vertically sectioned front view of a gate valve according to another embodiment of the present invention in an opened state. In the drawing, a valve main body 40 is provided with a bellows 41 which is elongated or contracted with the movement of a valve rod 5. The valve main body includes a bellows sealing structure that is displaced in a substantially orthogonal direction when a gate valve body 7 is moved at a flow passage port 4 in a direction orthogonal to the movement direction of the valve rod 5. As a result, the sealing property of the gate valve body 7 and a housing 21s enhanced, and the excellent sealing property is maintained even when the opening and closing operations of the gate valve body 7 are repeatedly carried out. In a still another embodiment of a gate valve according to the present invention shown in FIG. 12, a separate chamber insert 42 having a flow passage port 43 is provided, independently of a housing 45, so that it can be attached to a non-illustrated chamber or the like. When a gate valve body 7 is moved, sealing can be carried out between a seal member 8 on a gate valve body 7 and the chamber insert 42. As far as the flow passage can be opened and closed, the flow passage port may be formed in a separate member that is provided independently of the housing 45. A valve body portion 44 is prepared as a separate member from the gate valve body 7 and detachably fixed to the gate valve body by means of screws or the like. As described above, by separately providing in advance the valve body portion 44 to which the seal member 8 is attached independently of the gate valve body 7, replacement or maintenance of the seal member 8 upon the seal member 8 being worn off can be performed with ease.

What is claimed is:

1. A non-rubbing gate valve for a semiconductor fabrication apparatus, said gate valve comprising:
   a valve main body having a gate valve body attached to a valve rod;
   a movement operation mechanism that moves the valve rod in a direction along an axis of the rod up to a first position where the gate valve body stops up a flow passage port used for carrying in and out objects;
   a rotating motion mechanism for rotating the valve rod, which has been moved to the first position, by a predetermined angle;
   a horizontal drive gear for moving the gate valve body in a direction orthogonal to the direction of movement of the valve rod to seal the flow passage port,
   wherein the movement operation mechanism includes a cylinder disposed in the valve main body for enabling the valve rod to be movable,
   wherein the rotating motion mechanism comprises a screw of a lead angle of about 45 degrees provided at the valve rod and a change nut for enabling the valve rod to be rotatable after being moved to the first position, and wherein the horizontal drive gear mechanism comprises an eccentric cam provided at an upper end of the valve rod located in the gate valve body and capable of rotating to move the gate valve body in the direction orthogonal to the direction of movement of the valve rod.

2. A non-rubbing gate valve for a semiconductor fabrication apparatus according to claim 1, further comprising a guide roller provided at a side surface of the valve rod, a housing for the valve main body and a guide provided in the housing for performing movement of the gate valve body in the direction orthogonal to the movement direction of the valve rod, which movement is rotational movement of the valve rod.

3. A non-rubbing gate valve for a semiconductor fabrication apparatus according to claim 1, wherein the eccentric cam has a structure that enables the gate valve body to attain sealing at a bottom dead center of the eccentric cam so as to enable a valve-sealing function to be retained even after discharge of operation air.

4. A non-rubbing gate valve for a semiconductor fabrication apparatus according to claim 1, further comprising a bellows attached to the valve body for elongating or contracting in accordance with the movement of the valve rod to form a bellows seal structure displaced in a substantially orthogonal direction when the gate valve body has moved at the flow passage port in the direction orthogonal to the direction of the movement of the valve rod.

5. A non-rubbing gate valve for a semiconductor fabrication apparatus according to claim 1, further comprising a guide roller secured to a side surface of the valve rod, and a housing including a L-shaped guide groove, wherein the valve rod extends through the housing and the guide roller is received in the L-shaped guide groove.

6. A non-rubbing gate valve for a semiconductor fabrication apparatus according to claim 1, wherein the movement operation mechanism further includes a piston disposed in the cylinder and a piston rod connected at one end to the piston and at the other end to a cam plate which is connected to the valve rod, and wherein the movement operation mechanism effects linear non-rotational movement of the valve rod to the first position.

\* \* \* \* \*